United States Patent [19]

Nylund

[11] Patent Number: 5,404,383
[45] Date of Patent: Apr. 4, 1995

[54] SPACER FOR NUCLEAR REACTOR FUEL ASSEMBLY

[75] Inventor: Olov Nylund, Västerås, Sweden

[73] Assignee: ABB Atom AB, Västerås, Sweden

[21] Appl. No.: 18,245

[22] Filed: Feb. 16, 1993

[30] Foreign Application Priority Data

Mar. 17, 1992 [SE] Sweden ................... 9200811

[51] Int. Cl.6 ............................................. G21C 3/34
[52] U.S. Cl. ................................ 376/438; 376/439;
376/443
[58] Field of Search ............... 376/438, 439, 443;
976/DIG. 60, DIG. 78, DIG. 75

[56] References Cited

U.S. PATENT DOCUMENTS

| 4,426,355 | 1/1984 | Burger | 376/442 |
| 4,726,926 | 2/1988 | Patterson et al. | 376/439 |
| 4,758,403 | 7/1988 | Noailly | 376/439 |
| 4,885,127 | 12/1989 | Yokoyama | 376/462 |
| 4,999,153 | 3/1991 | Johansson et al. | 376/443 |
| 5,080,858 | 1/1992 | Nylvnd | 376/443 |
| 5,143,691 | 9/1992 | Lippert et al. | 376/443 |

Primary Examiner—Donald P. Walsh
Assistant Examiner—Meena Chelliah
Attorney, Agent, or Firm—Watson, Cole, Grindle & Watson

[57] ABSTRACT

A spacer for retaining a number of elongated fuel rods into a bundle to be placed in a nuclear reactor of BWR or PWR type. The bundle is intended to be traversed in the longitudinal direction by a coolant. The spacer includes a number of cells for the fuel rods surrounded by an outer frame which is formed from a first band standing on edge. This band has possibly been extended by a skirt arranged on the upstream side of the spacer. The band or skirt edge of the spacer located on the upstream side thereof is provided with guiding tabs which are formed from plate flaps which lie in planes which extend in parallel with the flow direction of the coolant and one side edge of which slantingly extends from the first band or skirt edge in an upstream direction towards the center of the spacer.

8 Claims, 4 Drawing Sheets

SPACER FOR NUCLEAR REACTOR FUEL ASSEMBLY

BACKGROUND AND SUMMARY OF THE INVENTION

The present invention relates to a spacer for retaining and fixing elongated fuel rods in a bundle arranged in a fuel box for a boiling-water reactor (BWR) or directly in the core for a pressurized-water reactor (PWR). The bundle is traversed in its longitudinal direction by a coolant. The spacers contain a number of cells for mutually fixing the fuel rods and are surrounded by an outer frame. This is normally formed from a first band, standing on edge, which may possibly be extended in the flow direction of the coolant by a skirt arranged on the upstream side of the spacer. To prevent the bundle from getting stuck when being inserted into a fuel box or into the core of a pressurized-water reactor, all the spacers have been provided with so-called guiding tabs. In known devices such tabs are formed from flaps or lugs extending from the spacer frame or the upstream edge of the skirt, these flaps being bent towards the centre of the spacer around a folding axis coinciding with the edge, that is, an axis perpendicular to the flow direction. This means that the flaps will present a large part of its side surface across the flow direction of the coolant. This, in turn, means that the flow resistance of the spacer is considerably increased, which, of course, is a drawback. In addition, the guiding tabs which are provided on the lower edge of the frame conduct the coolant away from the fuel rods and may thus deteriorate the cooling.

The present invention relates to an embodiment of the guiding tabs which eliminates the above-mentioned drawbacks. According to the invention, a guiding tab is formed from a plate flap or the like, the plane of which is arranged in parallel with the flow direction of the coolant and one side edge of which slantingly extends from the first band or skirt edge in an upstream direction towards the centre of the spacer. In this way, only the cross-sectional area of the plate flap perpendicular to the plane of the plate and the flow direction will constitute an obstacle to the flow of the coolant through the bundle. The reason for this is that the side surface of the plate flap will be parallel to the flow direction and thus not give rise to any flow resistance, nor will it control the coolant away from the fuel rods.

The invention will be most readily understood with reference to the accompanying drawings.

DETAILED DESCRIPTION OF THE PREFERRED EMBODIMENTS

Figure 2:
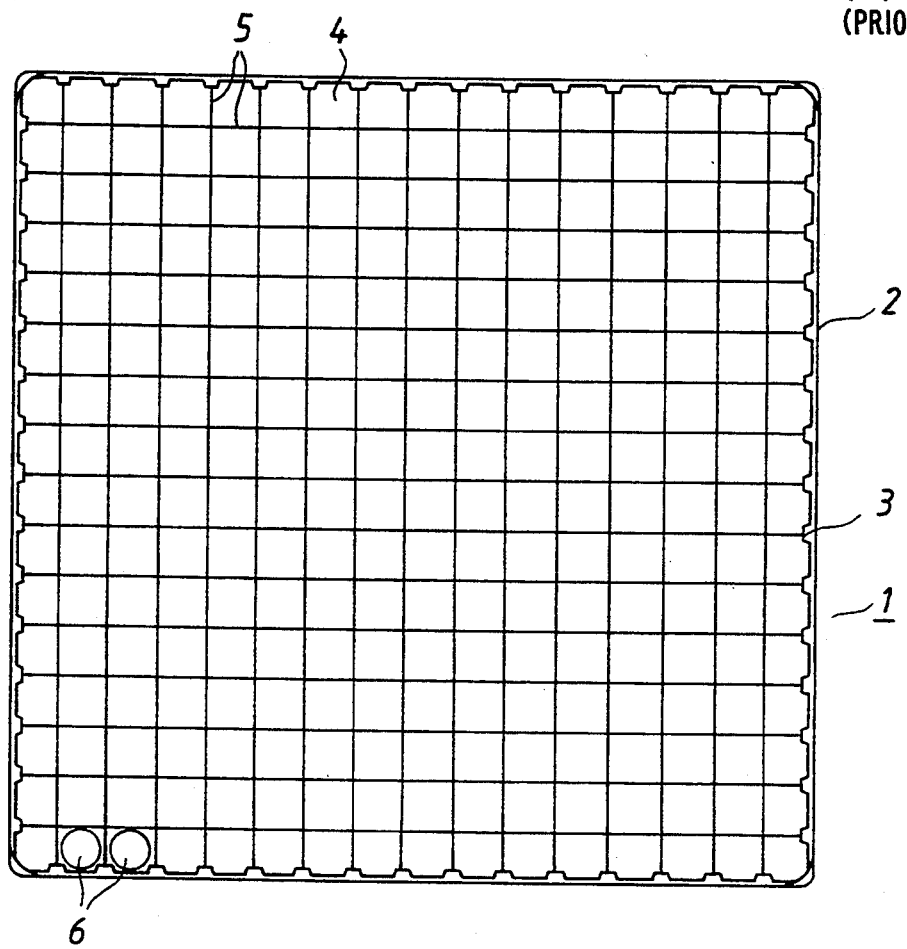
FIG. 2 shows a spacer according to FIG. 1 seen from above.
Figure 1:
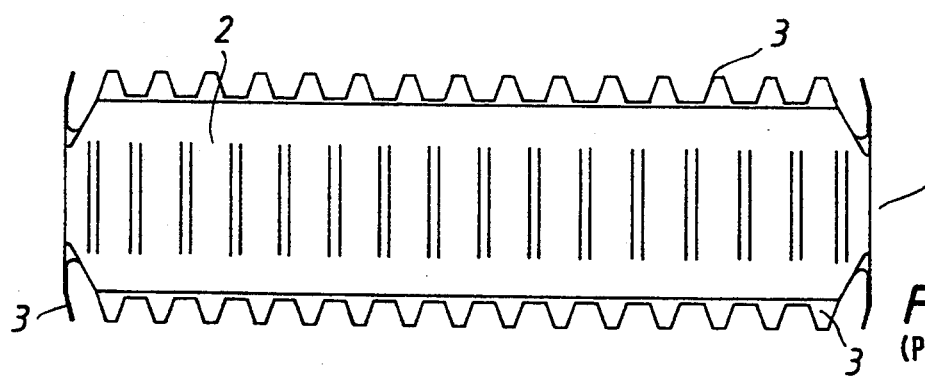
FIG. 1 shows a known spacer seen from the side.

FIG. 1 shows a spacer 1 of a well-known design suitable for use for a nuclear reactor of PWR type. In the figure the frame of the spacer 1 is designated 2 and the guiding tabs, which in this case are present both on the upstream side (the lower side) of the frame and on its downstream side, are designated 3. FIG. 2 shows the same spacer with cells 4 for the fuel rods (not shown). The cells 4 are formed from bands 5 standing on edge. In the cells 4 the fuel rods 6 are fixed.

Figure 3:
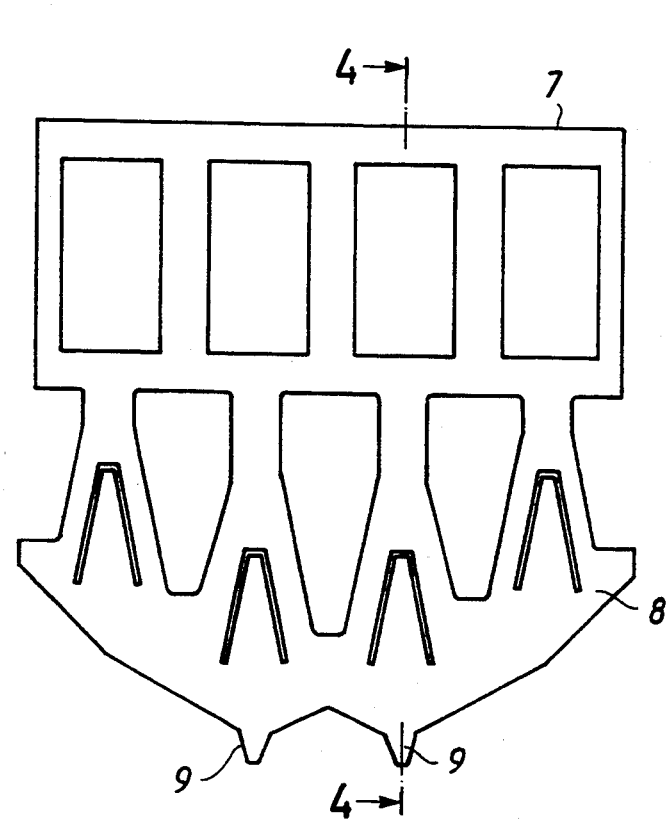
FIG. 3 shows another type of known spacer provided with a skirt.
Figure 4:
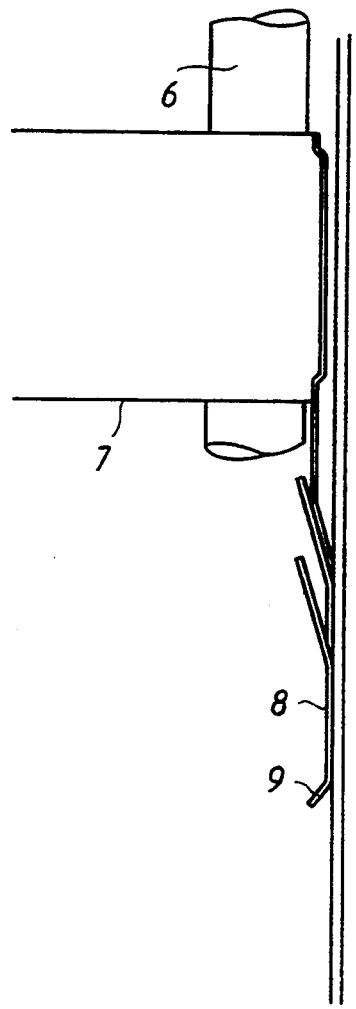
FIG. 4 shows a section 4—4 of a spacer according to FIG. 3.

FIG. 3 shows another type of known spacer, the frame 7 of which is extended by a skirt 8 in the flow direction. This skirt 8 is provided at its lower edge with guiding tabs 9 of the same type as the guiding tabs 3. FIG. 4 shows a section 4—4 of FIG. 3 with the same designations inserted and with part of a fuel rod 6.

Figure 5:
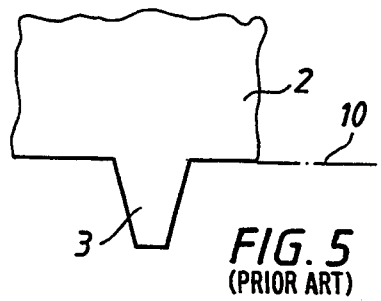
FIG. 5 shows one of the guiding tabs shown in FIGS. 1-4.
Figure 6:
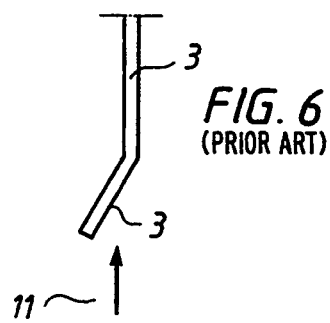
FIG. 6 shows a guiding tab according to FIG. 5 seen from the side.

FIG. 5 shows an enlargement of a guiding tab 3 on the frame 2 and FIG. 6 shows how these tabs 3 are bent around a folding axis 10 (shown in FIG. 5) extending parallel to the lower edge of the frame 2 and perpendicular to the flow direction 11 of the coolant.

Figure 7:
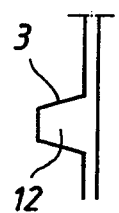
FIG. 7 shows the surface presented by a guiding tab according to FIGS. 1-6 across the flow direction.

FIG. 7 shows the tab 3 seen from below and illustrates the surface 12 presented by the oblique plane of the tab 3 across the flow direction. Since the bending of the tab 3 takes place in a direction towards the centre of the spacer 1, it is also easy to understand that when the coolant flowing upwards through the bundle contacts the guiding tab 3, the coolant is guided in a direction away from the centre of the bundle, thus deteriorating the cooling.

Figure 8:
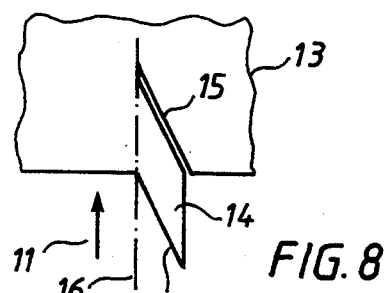
FIG. 8 shows the lower edge of a spacer frame with a guiding tab according to the invention. The guiding tab is prepared for folding around a vertical folding axis.

FIG. 8 shows an embodiment of the invention. In FIG. 8, 13 designates part of a first band standing on edge and forming the outer frame of the spacer. This band 13 is provided at its lower edge with a flap 14 which is partially separated from the band 13 by an oblique slot 15. The slot 15 is provided such that the flap 14 can be bent around a vertical folding axis 16 parallel to the flow direction 11.

Figure 9:
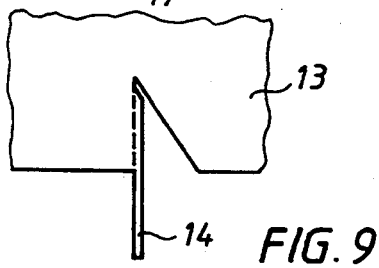
FIG. 9 shows a guiding tab according to FIG. 8 folded into the desired guiding position.
Figure 10:
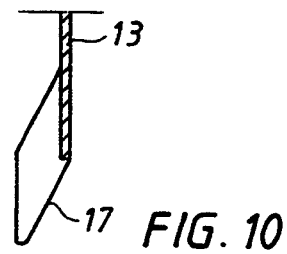
FIG. 10 shows the guiding tab according to FIG. 9 seen from the side.

In FIG. 9 the flap 14 has been folded to the desired position. By the form of the flap 14 a guiding tab is thus obtained, the plane of which is parallel to the flow direction 11 of the coolant and one side edge 17 of which according to FIG. 10 slantingly extends from the lower edge of the first band 13 in an upstream direction towards the centre of the spacer.

Figure 11:
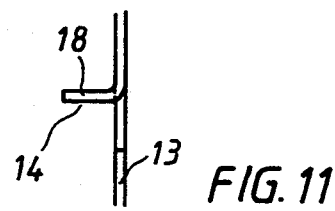
FIG. 11 shows the surface presented by a guiding tab according to the invention, FIGS. 8-10, across the flow direction.

FIG. 11 shows that in this way only the cross-sectional area 18 of the plate flap 14 perpendicular to the plane of the plate and the flow direction 11 will constitute an obstacle to the flow of the coolant through the bundle. Nor will the flap 14 guide the coolant away from the centre of the bundle.

Figure 12:
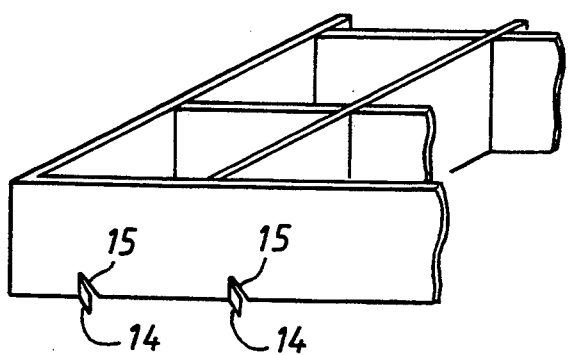
FIG. 12 shows the same guiding tabs arranged on the frame of a spacer.

FIG. 12 shows a schematic view of part of a spacer provided at its lower part with guiding tabs in the form of bent flaps 14.

Figure 13:
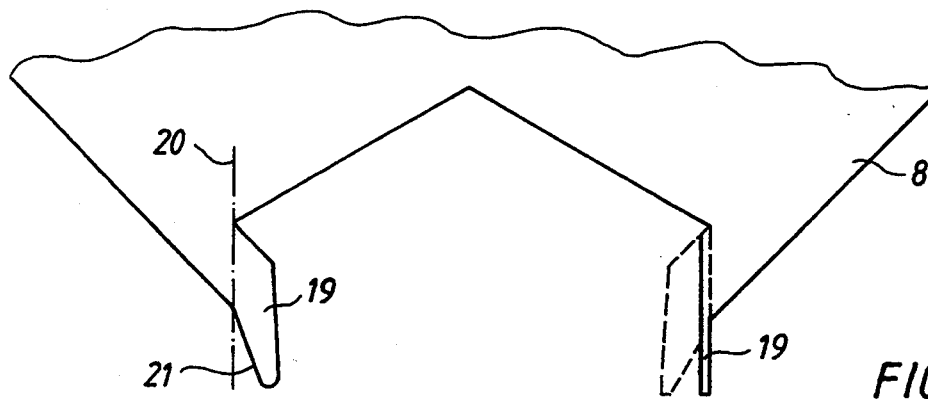
FIG. 13 shows how the guiding tabs are arranged in the case where the frame of the spacer is extended by a skirt. The lefthand tab in the figure is not folded into the final position as is the righthand tab.

FIG. 13 shows how a spacer equipped with a skirt 8 is provided with guiding tabs according to the invention. The lefthand flap 19 is shown in unfolded condition. It is cut such that it can be folded around a folding axis 20 parallel to the flow direction, and its edge 21 is oblique so as to function as guiding means when the flap 19 is folded into the position shown in the righthand part of FIG. 13.

Figure 14:
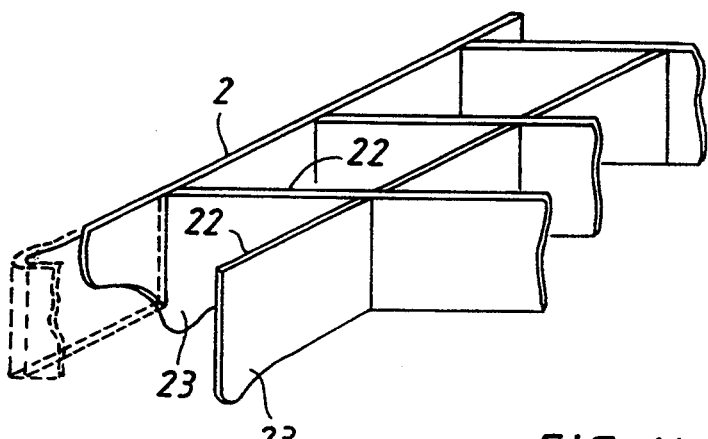
FIG. 14 shows another embodiment of guiding tabs where the second bands, forming the cells of the spacer, are formed with a projecting tab at their ends fixed in the frame.
Figure 15:
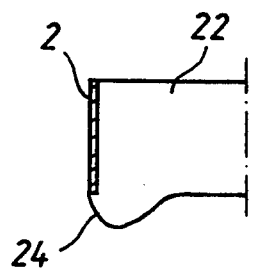
FIG. 15 shows a tab according to FIG. 14 seen from the side.

FIG. 14 shows part of a spacer whose cells are formed from second bands 22, standing on edge and arranged crosswise. At least some of these second bands 22 are formed, at their ends fixed in the frame 2, with a guiding tab 23 projecting upstream. FIG. 15 shows how the frame 2 is folded into the end of the second band 22 such that the slanting edge 24 extends all the way to the outside of the frame to ensure that the bundle when being inserted does not adhere to the lower edge of the frame 2. Guiding tabs of this type will, of course, function in the same way as the previously described ones. It should be noted that certain types of spacers are provided with guiding tabs also at their upper edge to ensure a withdrawal of a bundle from the reactor core.

I claim:

1. A spacer for retaining a number of elongated fuel rods in a bundle for placement in a nuclear reactor, said bundle being intended to be traversed in longitudinal direction by a flow of coolant, said spacer comprising a number of cells for the fuel rods surrounded by an outer frame which is formed from a first band, standing on edge, the first band being provided with guiding tabs, wherein each guiding tab is formed from a plate flap lying in a plane which extends in parallel with said flow direction of the coolant and one side edge of which slantingly extends from said first band in an upstream direction towards a centre of the spacer.

2. A spacer according to claim 1, wherein each guiding tab is formed from a flap projecting upstream from the first band with an oblique edge extending up to a folding axis and arranged folded towards the centre of the spacer around said folding axis which extends in parallel with the flow direction.

3. A spacer according to claim 1, including second bands standing on edge and arranged crosswise of said outer frame to provide said cells, wherein at least certain of said second bands, at ends thereof fixed in the outer frame, are formed with a guiding tab projecting upstream and arranged in the same plane as the plane of the associated second band.

4. A spacer according to claim 1, wherein a downstream edge of the outer frame is provided with guiding tabs that lie in planes that extend in parallel with the flow direction of the coolant.

5. A spacer for retaining a number of elongated fuel rods in a bundle for placement in a nuclear reactor, said bundle being intended to be traversed in a longitudinal direction by a flow of coolant, said spacer comprising a number of cells for the fuel rods surrounded by an outer frame which is formed from a first band, standing on edge, and a skirt which extends from the first band in an upstream direction, the skirt being provided with guiding tabs, wherein each guiding tab is formed from a plate flap lying in a plane which extends in parallel with said flow direction of the coolant and one side edge of which slantingly extends from said skirt in an upstream direction towards a centre of the spacer.

6. A spacer according to claim 1, wherein each guiding tab is formed from a flap projecting upstream from the skirt with an oblique edge extending up to a folding axis and arranged folded towards the centre of the spacer around said folding axis which extends in parallel with the flow direction.

7. A spacer according to claim 1, including second bands standing on edge and arranged crosswise of said outer frame to provide said cells, wherein at least certain of said second bands, at ends thereof fixed in the outer frame, are formed with a guiding tab projecting upstream and arranged in the same plane as the plane of the associated second band.

8. A spacer according to claim 1, wherein a downstream edge of the outer frame is provided with guiding tabs that lie in planes that extend in parallel with the flow direction of the coolant.

* * * * *